Patented Aug. 1, 1933

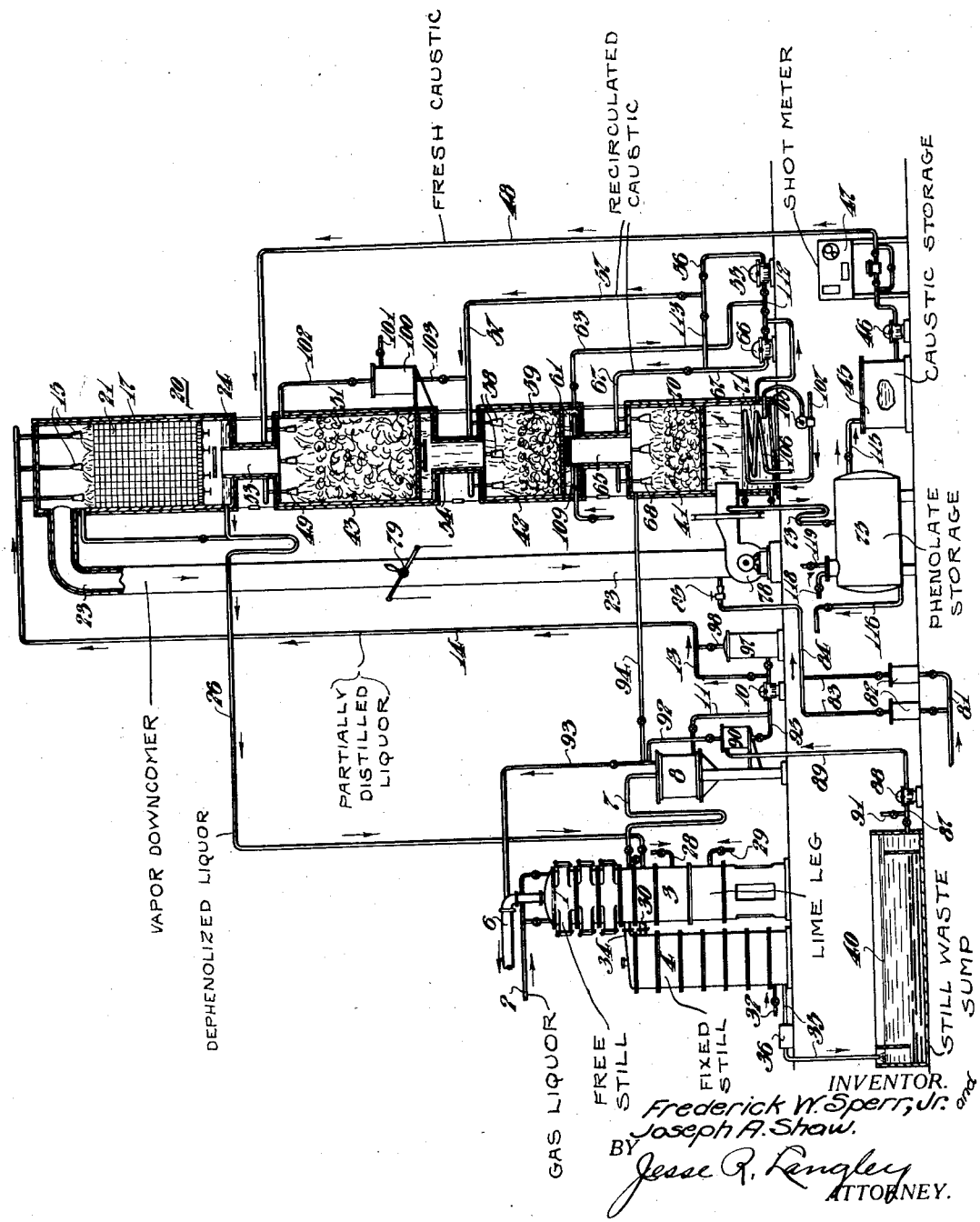

1,920,604

UNITED STATES PATENT OFFICE 1,920,604

TREATMENT OF LIQUIDS CONTAINING TAR ACIDS

Frederick W. Sperr, Jr., and Joseph A. Shaw, Pittsburgh, Pa., assignors to The Koppers Company of Delaware, a Corporation of Delaware Application January 9, 1931. Serial No. 507,618

20 Claims. (Cl. 260—154)

Our invention relates to the treatment of liquids containing tar acids, and especially to the treatment of liquor produced in the manufacture and purification of fuel gas for the removal of tar acids therefrom.

In many localities the discharge of industrial effluents and other waste liquors contaminated with tar acids into water courses, sewers, etc., is prohibited. Consequently, many industries have been confronted with a serious problem regarding disposal of effluents contaminated with phenols (tar acids) including phenol, cresol, and their homologues.

This problem has been especially acute in the manufactured gas industry where it is general practice to cool and partially condense the crude gas from coke ovens, retorts, etc., to remove tar and ammonia. During this condensation ammoniacal gas liquor is produced in the presence of tar, and the liquor is contaminated with water soluble portions of the tar, especially the tar acids, to an extent dependent upon the concentration of phenols in the tar, the system of condensation, the temperature to which the gas is cooled, etc.

The amount of ammoniacal liquor obtained also varies according to the process of condensation and ammonia recovery use. In the direct process of ammonia recovery which is widely used in this country, gas liquor production generally amounts to about twenty gallons per ton of coal carbonized, and this liquor usually contains from two to five grams of tar acids per liter. In the indirect process of ammonia recovery, a much greater volume of liquor is produced.

When gas liquor is distilled in the usual manner for recovery of ammonia, the major portion of the tar acids remains in the liquor and is discharged in the ammonia still waste. At least a portion of these tar acids is "fixed" in the form of salts such as calcium phenolate when discharged from the still, but when such compounds get into streams the tar acids are liberated by the action of carbon dioxide and other acidic constituents of the water. If this water is subsequently chlorinated in the course of purification for municipal consumption, as often happens, an unpleasant taste may result, and it is this nuisance that regulations prohibiting phenolic pollution of streams are intended to prevent.

In many instances it is unfeasible or impossible to dispose of the effluent from gas plant ammonia stills without allowing at least part of it to get into water courses. The unpleasant consequences of such an occurrence are accentuated by the fact that large gas plants, coke-oven plants, and the like, are frequently located near centers of population where it is customary to obtain the municipal water supplies from streams.

To eliminate this nuisance it is frequently desirable to remove tar acids prior to the discharge of the still waste. To accomplish this removal, several processes of dephenolization have been developed. Of these the most successful is the vapor recirculation process described by Joseph A. Shaw in a copending application Serial No. 230,570, filed November 2, 1927, (Case No. 103).

In that process, ammoniacal gas liquor is distilled for removal of free ammonia in the usual manner. The hot liquor is then scrubbed with a countercurrent of recirculated gas, such as air, which is saturated with steam and at a temperature near the boiling point of the liquor, and which removes tar acids from the liquor. The dephenolized liquor is then mixed with lime and distilled to recover the previously fixed ammonia, and the still waste may be discharged as desired, substantially without danger of phenolic pollution of streams.

The vapor or saturated gas serves to transfer the phenols removed from the liquor in the stripping stage of the dephenolization process to a suitable absorbing agent, such as caustic soda solution, with which the enriched vapor is contacted in the absorbing stage of the process. The caustic reacts with the tar acids to form sodium phenolate and analogous compounds. The purified vapor is recirculated to dephenolize further quantities of liquor and the phenolate solution is withdrawn and treated for recovery of phenols or otherwise disposed of. Fresh caustic solution is supplied to replace the withdrawn phenolate.

In the application of this process on a commercial scale we have made certain modifications resulting in an improvement in the process and apparatus for removing tar acids from liquids containing them, which is an object of our invention.

Another object of our invention is to provide a process of and apparatus for removing tar acids from liquids containing them more efficiently than has been possible by means of prior processes and apparatus.

A further object of our invention is to provide a process of and apparatus for removing tar acids from liquids containing them more economically than has been possible by means of prior processes and apparatus.

Our invention has for further objects such other advantages and results as are found to obtain in the process and apparatus hereinafter described and claimed.

We have found that preventing the carbonation of the caustic which absorbs tar acids from the recirculating vapor, and which sometimes becomes carbonated due to the presence of carbon dioxide in the liquor or in the vapor, increases the efficiency of dephenolization as well as making it more economical. We have found that combining the stripping stage and the absorbing stage of the dephenolizer into a single tower results in saving heat and ground space.

We have found that absorbing tar acids from the recirculating vapor in a plurality of stages including one stage or more in which the vapor is contacted with a recirculated absorbent and a stage in which it is contacted with intermittently supplied fresh absorbent results in especially efficient and economical operation, particularly with respect to the purification of the vapor and the conversion of the caustic to phenolate.

We have found that increased economy and efficiency result from the automatic regulation of temperature in the dephenolizing tower, and that control of the rate of vapor recirculation and a suitable system of vents on the hot liquor and solution lines are also beneficial.

We have found also that the substitution of a substantially oxygen free gas, such as a coke-oven gas, for air in the recirculating vapor minimizes corrosion and is especially economical if the gas is free from carbon dioxide.

We have found further that all of these advantageous results are obtained in the improved process of and apparatus for dephenolization constituting our present invention.

We now describe with reference to the accompanying drawing a preferred method of practicing our improved process of dephenolizing liquids containing tar acids, especially the ammoniacal gas liquor condensed from coke-oven gas and the like, and a preferred type of apparatus therefor. In the drawing, The single figure is a partially diagrammatic view, partly in elevation and partly in vertical section, of apparatus suitable for the practice of our present invention.

Ammoniacal gas liquor containing free and fixed ammonia, tar acids and other impurities such as $CO_2$, $H_2S$, and the like enters a free ammonia still 1 through a pipe 2. The still 1 is part of an installation of the usual type for recovering ammonia from ammonia liquor, said installation consisting of the free still 1, a lime mixing chamber 3 and a fixed ammonia still 4.

The liquor passes downwardly through the free still 1 in countercurrent flow with steam or other hot vapor which removes free ammonia and other volatile constituents from the liquor and carries them out of the still through a vapor line 6. The hot liquor then passes from the bottom of the free still 1 through a sealed offtake line 7 into an ammonia liquor surge tank 8. Temperatures are adjusted by controlling the rate at which steam is supplied to the still and/or dephlegmating the vapors leaving through pipe 6 so that substantially all of the free ammonia is removed but at least the major portion of the tar acids remains in the liquor discharged to tank 8.

A pump 10 withdraws liquor from the tank 8 through a pipe 11 and delivers it through pipes 13 and 14 and sprays 15 or other suitable distributing devices into the ammonia liquor section or stripping section 17 of a dephenolizing tower 20. The liquor is distributed by the sprays 15 over suitable contact material such as wooden hurdles or spiral tile packing 21 with which the section 17 is packed and passes downwardly over this packing. During its passage the hot liquor is intimately contacted with a countercurrent of hot vapor or saturated gas which removes tar acids from the liquor and leaves the section 17 through a downcomer 23.

The dephenolized liquor collects in a well 24 at the bottom of the stripping section 17 and is returned through a sealed and vented pipe 26 to the lime mixing chamber 3. In this chamber it is mixed with lime, or other suitable alkaline material introduced through a pipe 28, by means of steam brought in through pipe 29. The lime liberates the fixed ammonia and the liquor overflows from the lime mixing chamber through a pipe 30 to the fixed still 4. In this still the liquor is subjected to further distillation with steam introduced through a pipe 32 for removal of the previously fixed ammonia, and vapors pass from the fixed still 4 into the free still 1 through a pipe 34.

The distilled liquor, or still waste, is discharged from the bottom of the fixed still 4 through a pipe 35 and a trap 36 substantially free from ammonia and tar acids, and enters a still waste settling sump or basin 40 from which still waste is withdrawn to be disposed of as desired.

The stripping stage or section 17 of the dephenolizer 20 is preferably located at the top of a tower which also contains the absorbing stage. In the present instance, the absorbing stage consists of two recirculating absorbent sections 41 and 42, and a fresh absorbent section or "shot" section 43. Fresh caustic solution, or other suitable absorbent, is withdrawn from a mixing tank 45 by a pump 46 controlled by an automatic regulating meter 47 and delivered, preferably intermittently, through a pipe 48 and sprays 49 over contact material such as steel lathe turnings 51 with which the "shot" section 43 of the tower 20 is packed.

The caustic is held in the path of the recirculating vapor by the contact material and completes the purification of the vapor from tar acids. The thereby purified vapor passes through a pipe 53 into the stripping section 17 of the dephenolizer, where it removes tar acids from ammonia liquor as described hereinabove.

The fresh caustic drips down through the contact material 51 and through a connecting pipe 54 into the upper recirculating section 42 of the dephenolizer. Caustic solution is recirculated over this section by a pump 55 which delivers the solution through pipes 56 and 57 and sprays 58 onto the contact material 59 with which this section is packed.

Below the sprays 58 the recirculated caustic is mixed with the fresh caustic coming down through the pipe 54, and is thereby partially refreshed. The caustic then passes downwardly through the contact material and collects in a well 61 at the bottom of section 42, from which it returns through a pipe 63 to the pump 55 for recirculation.

The fresh caustic entering this section through the pipe 54 causes the well 61 to overflow, and the overflowing solution of caustic and phenolate passes downwardly through connecting pipe 65 to the lower recirculating section 41. The caustic-phenolate solution is recirculated over this section by a pump 66 which delivers the solution through a pipe 67 and sprays 68 onto the contact material 70 with which this section 41 is packed.

Below the sprays 68 this recirculating solution is mixed with the solution overflowing from well 61, and the combined solution passes down through the packing 70 and collects in a well or sump 71 at the bottom of the tower. The phenolate solution overflows from the well and passes through a sealed and vented discharge pipe 73 into a phenolate storage tank 75.

Vapor or saturated gas is recirculated through the dephenolizer 20 and the downcomer 23 by a blower 78 or other suitable means, at a rate which may be controlled by a butterfly valve or damper 79 in the downcomer 23.

The enriched or fouled vapor leaving the ammonia liquor section 17 at the top of the dephenolizer passes downwardly through the downcomer 23 and is recirculated into the lower section 41 of the tower. In this section a portion of the tar acids is removed from the gas, which then passes through pipe 65 into the second or upper recirculating section 42 where a further portion of the tar acids is removed by recirculated caustic-phenolate solution. The gas then passes through pipe 54 into the shot section 43 in which its purification from tar acids is completed and the purified or lean vapor re-enters the scrubbing section 17 through pipe 53.

This vapor may consist of any suitable inert gas such as air, ammonia, or the like, saturated with water vapor. However, we have found that beneficial results are obtained if a substantially oxygen-free gas such as coke-oven gas is used. Coke-oven gas is supplied through a pipe 81, a purifier or purifiers 82 and pipes 83 and 84 to a convenient point in the system, such as a point in the vapor line before or after the blower 78.

The admission of gas to the system is controlled by a pressure regulating valve 85 which only allows gas to enter when the pressure in the system is below normal. The purifiers 82 are filled with lime or other suitable material which serves to remove carbon dioxide and other acidic constituents from the gas and thus prevents the carbonation of the caustic by absorption of carbon dioxide introduced into the recirculating vapor from this source. It is important that such absorption be prevented, as carbonation of the caustic results in decreased efficiency of tar acid absorption and increased consumption of caustic, making the process more expensive as well as less efficient.

Another troublesome source of acidic impurities is the ammonia liquor itself, from which $CO_2$ and the like are usually nearly but not completely removed in the free ammonia still 1. We have found that the consumption of caustic resulting from absorption of carbon dioxide from this source can be prevented by adding substances which "fix" the $CO_2$ either to the liquor itself or to the recirculating caustic.

Examples of suitable "fixing" materials for this purpose are lime, magnesia, and soluble salts of calcium, barium, and other bases which form insoluble carbonates. A convenient and cheap supply of material of this nature is available in the still waste, which contains considerable quantities of calcium chloride, and which is ordinarily wasted.

We have found that by adding the proper amount of clarified still waste to the ammonia liquor before it enters the dephenolizer, the removal of $CO_2$ in the stripping section and its transfer to the absorbing section, resulting in carbonation of the caustic, are readily prevented. To accomplish this, clarified still waste is withdrawn from the settling sump 40 through a pipe 87 by a pump 88 and delivered through a pipe 89 to a tank 90. Alternatively, milk of lime, salts of calcium and other alkaline earth metals, and the like, may be introduced from some other source through a pipe 91 to the inlet side of the pump 88 and delivered to the tank 90.

The tank 90 is preferably vented to equalize its pressure with that in the surge tank 8 by a pipe 92 connecting tanks 90 and 8 above the levels of the liquids therein. The tank 8 is vented to prevent "vapor binding" in pipe 11 and pump 10 by a pipe 93, venting the tank back to the still 1, or a pipe 94 whereby the tank is vented to the dephenolizer 20, and pipe 92 may conveniently be connected to one of these vents.

The clarified still waste or other fixing material passes from the tank 90 through a pipe 95 to the inlet side of the pump 10 and is mixed with the liquor on its way to the dephenolizer. The fixing agent reacts with the carbon dioxide in the liquor to form insoluble carbonates, such as calcium carbonate, which are not decomposed in the dephenolizer and which have substantially no vapor pressure with respect to $CO_2$.

It is generally preferable, however, to remove the insoluble carbonate before the liquor goes to the dephenolizer. This is accomplished by a filter 97 to which the liquor is delivered by pump 10 and from which it passes through pipe 98 into pipe 14 and thence to the dephenolizer. The filter also removes pitch and other solids which might tend to clog the packing 21 in the stripping section 17 of the dephenolizer.

In some instances it may be preferable to prevent carbonation of the caustic by fixing the $CO_2$ in the form of insoluble carbonates after admission to the dephenolizer. We have found that this may be satisfactorily accomplished by adding milk of lime or other suitable material, such as a solution of an alkali earth metal salt, to the caustic in the absorbing section of the dephenolizer.

This procedure has the advantage of fixing $CO_2$ from other sources than the liquor—e. g., from the recirculated gas. Furthermore, if lime is used as the fixing agent it recausticizes the alkali carbonates usually present in the caustic due to absorption of $CO_2$ from the air or to incomplete purification in the course of manufacture.

The fixing material may be supplied in a variety of ways to the absorbing section of the dephenolizer, as by mixing it with the fresh caustic solution supplied to the shot section 43, but we have found it to be advantageous to make the additions to the recirculated caustic, preferably in the upper recirculating section 42. This is conveniently accomplished by means of a tank 100 to which the fixing solution or suspension is supplied through a pipe 101. The tank 100 is preferably vented to the dephenolizer, as by a pipe 102, and may be provided with a steam coil or other suitable heating means if desired.

The fixing solution or suspension passes from tank 100 through a pipe 103 into pipe 57, and enters the section 42 of the dephenolizer with the recirculated caustic-phenolate solution. In passing down through the packing in section 42, over which it is recirculated, and in section 41 to which it overflows from the well 61 in section 42, the lime or other fixing agent reacts with $CO_2$ carried by the recirculated vapor and removes it from the vapor. Contamination of the fresh caustic in the shot section 43 with $CO_2$ is thereby prevented, which makes it possible to remove traces of tar acids remaining in the vapor entering the shot section with a comparatively small amount of fresh caustic.

The rate at which the fixing agent is added to the caustic depends on what other steps are taken to prevent carbonation. If no other provision against carbonation is made, sufficient lime or similar material should be added to the recirculated absorbent to combine with $CO_2$ introduced into the system from the ammonia liquor and the gas, and to causticize any carbonates contained in the fresh caustic.

When the liquor and/or gas are treated with lime or the like, as described above, before admission to the dephenolizer, the amount of fixing material added to the absorbent may be correspondingly decreased. Any of these three methods of fixing $CO_2$ to prevent carbonation of the caustic may be used alone, or in combination with one or both of the others.

Although $CO_2$ is generally the most plentiful and consequently the most troublesome contaminator of the alkaline absorbent, other normally gaseous acidic constituents of ammonia liquor, such as $H_2S$, $HCN$, and the like, are similar to $CO_2$ in their effect on caustic consumption and tar acid absorption. Consequently what has been said hereinabove regarding the desirability of fixing $CO_2$ to prevent contamination of the absorbent applies also to these other acidic compounds when they are present in the liquor. Their fixation in the form of compounds which are insoluble and/or have substantially no vapor pressure is accomplished simultaneously with the fixation of $CO_2$ by the methods described hereinabove.

The temperature maintained in the dephenolizer is a very important factor in the efficiency of the process, and the best results are generally obtained when the dephenolized liquor leaves the stripping section 17 at a temperature near but slightly below its boiling point. Complete insulation of the tower and piping is important in keeping this temperature approximately constant, but is not in itself sufficient.

We have found that the desired temperatures throughout the system can be maintained by supplying heat to the wells 61 and/or 71 in the recirculating sections 42 and 41 respectively by steam coils or other suitable heating means. To simplify operation, the amount of heat supplied is automatically controlled, as by a temperature regulator 105 which controls the rate at which steam is supplied to a coil 106 in the well 71 through pipe 107.

The regulator 105 forms no part of the present invention. It is set to maintain the desired temperature in the well 71. When the temperature falls below that point, a valve is automatically opened allowing steam to enter and pass through the coil 106 until the desired temperature is reached, and the valve is then automatically closed. A similar regulator is preferably used to regulate the admission of steam to coil 109 in well 61.

The vapor ratio—that is, the number of volumes of vapor circulated per volume of liquor treated—also has an important bearing on the efficiency of dephenolization. In general, other conditions being equal, the higher the vapor rate the higher the efficiency up to a certain optimum ratio, which is usually between 1500 and 4000, but is sometimes higher. Above this optimum ratio, the efficiency increases more slowly with increased vapor rates.

To ensure the maximum efficiency obtainable, it is essential that the blower 73 be large enough to provide vapor recirculation at the optimum rate when the maximum quantity of liquor is being treated. However, the rate at which liquor is supplied for treatment may be and often is less than the maximum. When this occurs, the vapor ratio becomes higher than necessary, resulting in excessive power consumption. We have found that a means of throttling the blower to make the rate of vapor recirculation proportional to the liquor rate, such as the butterfly valve or damper 79 in the vapor downcomer 23, is effective in preventing unnecessary power consumption.

As has been stated previously, it is essential to the economy of our dephenolization process that the vapor or saturated gas be recirculated, which involves removing tar acids from a large volume of vapor on each cycle through the system. For example, in a plant carbonizing 1000 tons of coal per day about 20,000 gallons of ammonia liquor are produced, or about 2700 cu. ft. With a vapor ratio of 3000, dephenolization of this liquor involves purifying 8.4 million cu. ft. of vapor per day, or about 340 M cu. ft. per hr.

If the tar acid content of the gas liquor is 3 grams per liter (g. p. l.) which is reduced to .05 g. p. l. or less, the amount of tar acid removed is 2.95 g. p. l. or about 11 grams per gallon of liquor, making a total of 220,000 grams or about 484 lbs. per day. Assuming this to be entirely phenol, the amount of caustic soda theoretically required to react with it to form phenolate is 206 lbs. If twice this amount is actually used to ensure thorough removal of tar acids from the vapor, the total amount of caustic soda supplied is 412 lbs. per day, on a dry basis.

This caustic is supplied to the absorbing section of the dephenolizer in the form of a solution preferably containing about 10% NaOH, although we have found that other solution strengths, such as from 3% to 25% give satisfactory results. This 10% caustic solution, amounting to about 480 gallons per day, or 20 gallons per hr., must be so intimately contacted with the vapor that the vapor is very completely purified from tar acids.

For example, assuming that the vapor is so perfectly contacted with the liquor in the stripping section that phenols in the dephenolized liquor leaving this section are in equilibrium with phenols in the vapor entering, the tar acid content of this vapor (when condensed) must be not more than about twice the desired tar acid content of the dephenolized liquor. In practice this ratio must usually be lower than 2. As it is generally desirable to have the tar acid content of the dephenolized liquor as low as possible, it is preferable to purify the recirculated vapor to a tar acid content not exceeding 50 parts per million by weight when condensed.

It is obviously impractical to effectively contact 340 M. cu. ft. of flowing gas or vapor with 20 gallons of fresh absorbent in a scrubber of the usual type. To accomplish this we have employed the principle described by E. H. Bird in U. S. Patent 1,729,562, of intermittently supplying the absorbent solution at a sufficiently high rate to obtain good distribution over solid contact material in the path of the gas. At least a portion of the absorbent remains on the contact material until flushed off by a subsequent addition or shot of fresh absorbent.

We have found this shot system very efficient for the present purpose, as the caustic solution is sufficiently viscous to adhere readily to the steel turnings 51 or other contact material with which the shot section 43 of the dephenolizer is packed. The extensive caustic-coated surface thereby exposed to the vapor is very effective in removing tar acids therefrom. The shots may be of almost any desired frequency, and volume that result in delivering the desired total amount of absorbent. For instance, in the example given above a forty gallon shot might be delivered every two hours, or a twenty gallon shot every hour, or a ten gallon shot every half hour, etc.

The limiting frequencies are that at which shots are made just frequently enough to keep a coating of unconverted caustic on the contact material, and that at which the amount of liquid delivered per shot is just sufficient to ensure good distribution across the upper surface of the contact material. This upper limit is in turn dependent upon the concentration of the solution employed.

We have found that by means of our improved apparatus for dephenolization the recirculated vapor can be purified from tar acids to such an extent that adequate dephenolization of the ammonia liquor is achieved, and the conversion of caustic to phenolate is high. For example, in large scale operation we have obtained better than 95% removal of tar acids from the liquor when the caustic was more than 70% converted to phenolate before discharge to storage. The recirculating sections 41 and 42 are important in obtaining this high conversion and the consequent saving of caustic.

As the vapor passes through the two recirculating absorbent sections followed by a fresh absorbent shot section, the decreasing tar acid content of the vapor undergoing purification and the consequent increasing difficulty of further removal therefrom are compensated for by the decreased extent or percentage of the conversion to phenolate of the caustic with which the vapor is contacted, so that the purification is progressive and very complete. Also a major portion of the tar acid is absorbed in the lower section 41, from which phenolate is discharged to storage, so that the percentage conversion can become very high there without interfering with the ultimate purification of the vapor.

In some instances, one or both of the recirculating sections 41 and 42 may be omitted, or solution may be recirculated over both sections in series instead of in parallel. When a recirculating section (or sections) is omitted, the depth of packing in the shot section 43 is preferably increased.

In series operation of the recirculating sections 41 and 42, which is approximately equivalent in effect to using only one section with greater depth of contact material, only one recirculating pump is used. By installing suitable connecting pipes, such as a pipe 112 connecting the inlets of pumps 55 and 66 and a pipe 113 connecting the discharge pipes 56 and 67, either of these pumps is made available for this service.

The caustic-phenolate solution is then withdrawn from the lower well 71 by pump 66 or 55 and delivered through pipes 67 and 113, or through pipe 56, to pipe 57, through which it enters section 42. The absorbent is distributed by the sprays 58 over the contact material 59, through which it passes countercurrently to the flow of vapor, and collects in well 61.

From this well it overflows, passing downward through passage 65 onto the contact material 70 in section 41. After passing down through this packing it collects in the lower well 71 for recirculation, and excess solution overflows through the sealed vented discharge pipe 73 to the phenolate storage tank 75.

Whatever the number of absorbing sections in the dephenolizer, if it is desired to increase the percentage of conversion of the solution in the tank 75 a portion of it may be withdrawn through pipe 115 to the tank 45 and there mixed with fresh caustic to be returned to the absorbing system as described hereinabove.

Phenolate solution is discharged from tank 75 through a pipe 116 by air introduced under pressure through a pipe 118, or by a pump or other suitable means, for recovery of phenols or other disposal. The tank should also be provided with a vent 119.

It is to be understood that in the foregoing description the term "phenols" is synonymous with tar acids and includes phenol, cresol, and their homologues. Similarly "dephenolization" signifies the removal of these tar acids; "dephenolizer", the apparatus in which such removal is practiced; and "phenolate" the salts of these acids.

Furthermore, although our process has been described in connection with the removal of tar acids from ammoniacal gas liquor it is not limited to that application, but is broadly adapted to the treatment of any liquid containing tar acid.

It will be obvious to those skilled in the art that various modifications can be made in the several parts of our apparatus and the several steps of our process in addition to those enumerated hereinabove without departing from the spirit of our invention, and it is our intention to cover in the claims such modifications as are included within the scope thereof.

We claim as our invention:

1. The process of treating a liquid containing tar acid which comprises recirculating gas through said liquid and through an absorbent for tar acids, and preventing contamination of said absorbent with normally gaseous acidic impurities by chemically combining said impurities to form substantially insoluble compounds.

2. The process of treating a liquid containing tar acid and normally gaseous acidic impurities which comprises recirculating gas through said liquid and through an alkaline absorbent for tar acids, and preventing contamination of the said alkaline absorbent with acidic impurities by chemically combining said impurities to form compounds insoluble in the said absorbent.

3. The process of treating a liquid containing tar acid and carbon dioxide which comprises recirculating gas through said liquid and through an alkaline absorbent for tar acids and preventing the carbonation of the said alkaline absorbent by chemically combining said carbon dioxide to form a substantially insoluble compound.

4. The process of treating a liquid containing tar acid which comprises recirculating an inert gas through said liquid and through an absorbent for tar acids in a system maintained at a temperature near the boiling point of the said liquid, and preventing absorption of carbon dioxide by the said absorbent by chemically combining carbon dioxide entering the system to form an insoluble compound having substantially no vapor pressure with respect to carbon dioxide.

5. The process of treating an aqueous liquid containing tar acid which comprises recirculating gas through a system including a stripping stage wherein the said gas removes tar acid from the said liquid and through an absorbing stage wherein tar acid is absorbed from the recirculating gas by an alkaline solution, and contacting carbon dioxide entering the said system with a fixing agent with which the carbon dioxide reacts to form an insoluble compound, whereby carbonation of the said alkaline solution is prevented.

6. The process of treating a liquid containing tar acid which comprises recirculating hot gas saturated with water vapor through a dephenolizing system wherein the said gas transfers tar acid from the said liquid to an alkaline absorbent for tar acids, and preventing carbonation of the said alkaline absorbent with carbon dioxide entering the system in volatile form as a constituent of said liquid by contacting such carbon dioxide with an alkaline-earth metal compound.

7. The process of treating a liquid containing tar acid which comprises recirculating hot gas saturated with water vapor through a dephenolizing system wherein the said gas transfers tar acid from the said liquid to an alkaline absorbent for tar acids, and preventing carbonation of the said alkaline absorbent with carbon dioxide entering the system in volatile form as a constituent of said liquid by causing said carbon dioxide to react with a calcium compound to form calcium carbonate.

8. In a process of transferring tar acid from an aqueous liquid containing it and free carbon dioxide to an alkaline absorbent for tar acids by a current of hot gas, the method of preventing carbonation of the said alkaline absorbent which comprises adding to the said liquid a fixing agent with which the said carbon dioxide reacts to form an insoluble compound.

9. In a process of transferring tar acid from an aqueous liquid containing it and free carbon dioxide to an alkaline absorbent for tar acids by a current of hot gas, the method of preventing carbonation of the said alkaline absorbent which comprises adding to the said liquid ammonia-still waste containing a sufficient quantity of calcium salts to combine with the said carbon dioxide to form calcium carbonate.

10. In a process of transferring tar acid from an aqueous liquid to an alkaline absorbent for tar acids by a current of gas, the method of preventing carbonation of said alkaline absorbent with carbon dioxide contained in said gas which comprises removing carbon dioxide from said gas by chemically combining the said carbon dioxide with a fixing agent with which the gas is contacted.

11. The process of treating a liquid containing tar acid which comprises passing gas through the said liquid and through an alkaline absorbent for tar acids containing a fixing agent which reacts with carbon dioxide to form an insoluble carbonate.

12. The process of treating a liquid containing tar acid which comprises contacting gas with a fixing agent which reacts with carbon dioxide to form an insoluble compound having substantially no vapor pressure with respect to carbon dioxide, and recirculating the said gas through a system in which it removes tar acid from the said liquid and transfers the removed tar acid to an alkaline absorbent.

13. The process of treating a liquid containing tar acid and carbon dioxide which comprises adding to the said liquid a fixing agent which reacts with the said carbon dioxide to form an insoluble compound, filtering the liquid to remove solids therefrom, and recirculating gas through the filtered liquid and through an alkaline absorbent for tar acids at a temperature near the boiling point of the liquid.

14. The process of treating ammoniacal gas liquor containing tar acid and carbon dioxide which comprises recirculating hot gas saturated with water vapor through said liquor and through an alkaline absorbent for tar acids, whereby tar acid is transferred from the said liquor to the said absorbent, and chemically combining the carbon dioxide with a fixing agent to form an insoluble compound, whereby carbonation of the said absorbent is prevented.

15. The process of transferring tar acid from an aqueous liquid containing it to an alkaline absorbent for tar acids, which comprises recirculating gas through a stripping stage wherein it removes tar acid from the said liquid and through an absorbing stage wherein the recirculated gas is purified from tar acid by an alkaline solution, said solution being supplied intermittently to a section of the absorbing stage and recirculated over another section of said stage countercurrently with the flow of recirculated gas therethrough.

16. The process of removing tar acid from gas which comprises contacting the gas with a recirculated alkaline absorbent for tar acids, whereby tar acid is partially removed from the gas, and then contacting the gas with intermittently supplied fresh absorbent.

17. The process of removing tar acid from gas which comprises contacting the gas with a recirculated solution containing caustic soda which partially removes tar acid from the gas and combines with the removed tar acid to form sodium phenolate in the solution, and then contacting the gas with intermittently supplied fresh solution containing caustic soda.

18. The process of removing tar acid from gas which comprises contacting the gas with a recirculated alkaline solution whereby tar acid is partially removed from the gas, then contacting the gas with a smaller amount of intermittently supplied relatively uncontaminated alkaline solution, adding the latter solution to the recirculating solution, withdrawing excess recirculating solution, mixing the withdrawn solution with substantially fresh alkaline solution, and intermittently returning portions of the resulting mixed solution into contact with the gas.

19. The process of removing tar acid from gas which comprises contacting the gas with an alkaline solution which absorbs tar acid, thereby forming alkali phenolate in the solution and purifying the gas, withdrawing the solution from contact with the gas, mixing fresh alkaline solution with the withdrawn solution, and intermittently supplying the resulting mixed solution to the system to remove tar acid from a further quantity of gas.

20. The process of treating ammoniacal gas liquor containing tar acid and carbon dioxide, which comprises distilling the liquor to remove free ammonia therefrom, transferring tar acid from the liquor to an alkaline absorbent for tar acids by means of a gas recirculated through the liquor and through the absorbent at a temperature near the boiling point of the liquor, and chemically combining the carbon dioxide with a fixing agent to form an insoluble carbonate, whereby carbonation of the said alkaline absorbent is prevented.

FREDERICK W. SPERR, Jr.
JOSEPH A. SHAW.